Sept. 20, 1927.

R. H. KOENIG 1,643,215

MACHINE FOR SHAPING ENDS OF GLASS TUBES

Filed Aug. 7, 1924   8 Sheets-Sheet 1

Fig. 1.

Inventor-
Robert H. Koenig.
by his Attorneys.
Howson & Howson.

Sept. 20, 1927.  1,643,215
R. H. KOENIG
MACHINE FOR SHAPING ENDS OF GLASS TUBES
Filed Aug. 7, 1924   8 Sheets-Sheet 4

Fig.4.

Inventor:-
Robert H. Koenig.
by his Attorneys,-
Howson & Howson.

Sept. 20, 1927. 1,643,215
R. H. KOENIG
MACHINE FOR SHAPING ENDS OF GLASS TUBES
Filed Aug. 7, 1924 8 Sheets-Sheet 6

Inventor.
Robert H. Koenig.
by his Attorneys.

Patented Sept. 20, 1927.

1,643,215

UNITED STATES PATENT OFFICE.

ROBERT H. KOENIG, OF HADDON HEIGHTS, NEW JERSEY, ASSIGNOR TO RUTH GLASS COMPANY, OF CONSHOHOCKEN, PENNSYLVANIA, A CORPORATION OF PENNSYLVANIA.

MACHINE FOR SHAPING ENDS OF GLASS TUBES.

Application filed August 7, 1924. Serial No. 730,638.

The invention relates to machines for shaping the ends of glass tubes and the like, and the principal object of the invention is to provide a machine having greater capacity than the machines now generally used.

More specifically, the object of the invention is to provide a machine comprising means for feeding the tubes or blanks continuously and successively through a series of operations involved in forming the vial. In this machine the various operations proceed continuously, the operating elements used in the final operation working upon one blank simultaneously with the elements employed in the preceding operations working upon the various succeeding blanks, so that there are no periods of idleness for any of the operating elements. As a result of this continuous and simultaneous operation the output of the machine per unit of time is considerably greater than that of machines in which each blank must be carried through all operations before a succeeding blank can be started.

The invention further resides in the novel construction whereby the aforesaid desired results are obtained and in the numerous novel structural and mechanical details hereinafter described and illustrated in the attached drawings, in which.

Figure 2:
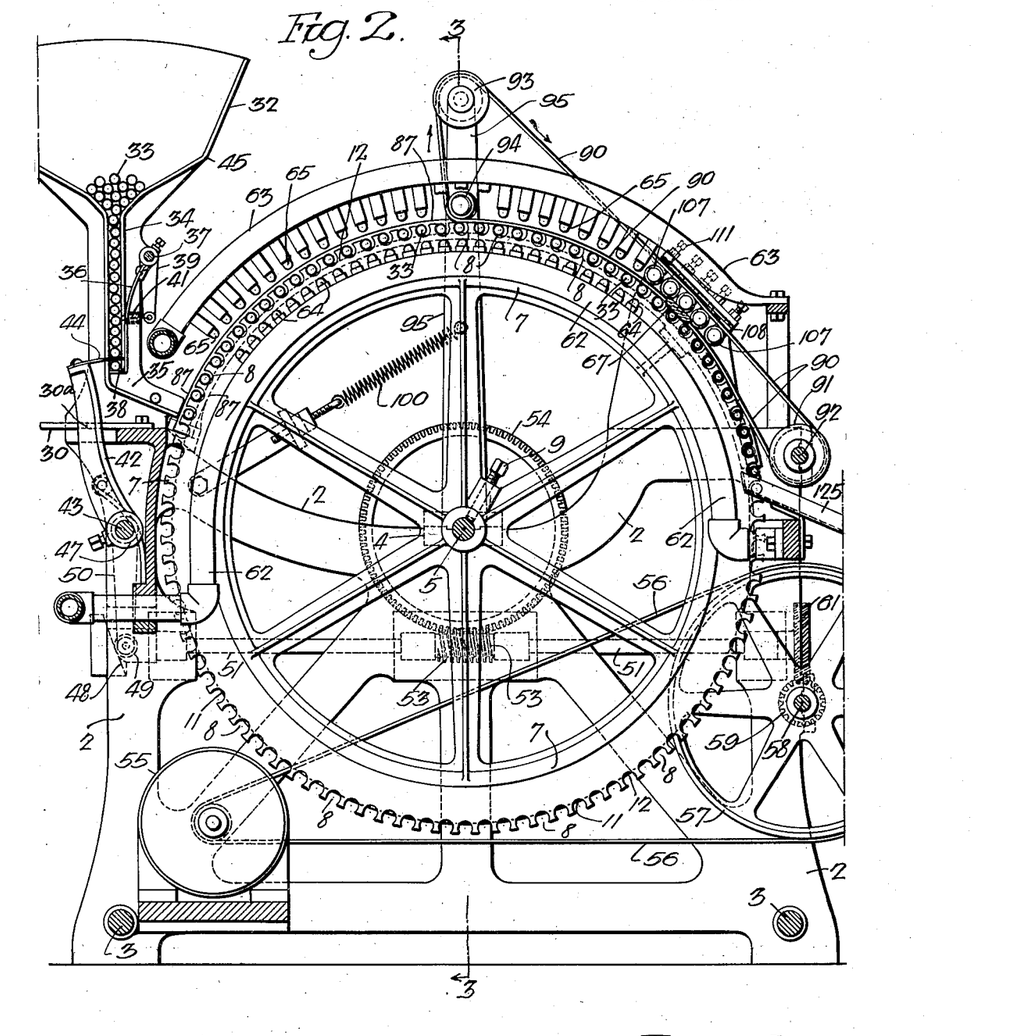
Fig. 2 is a longitudinal sectional elevation.
Figure 3:
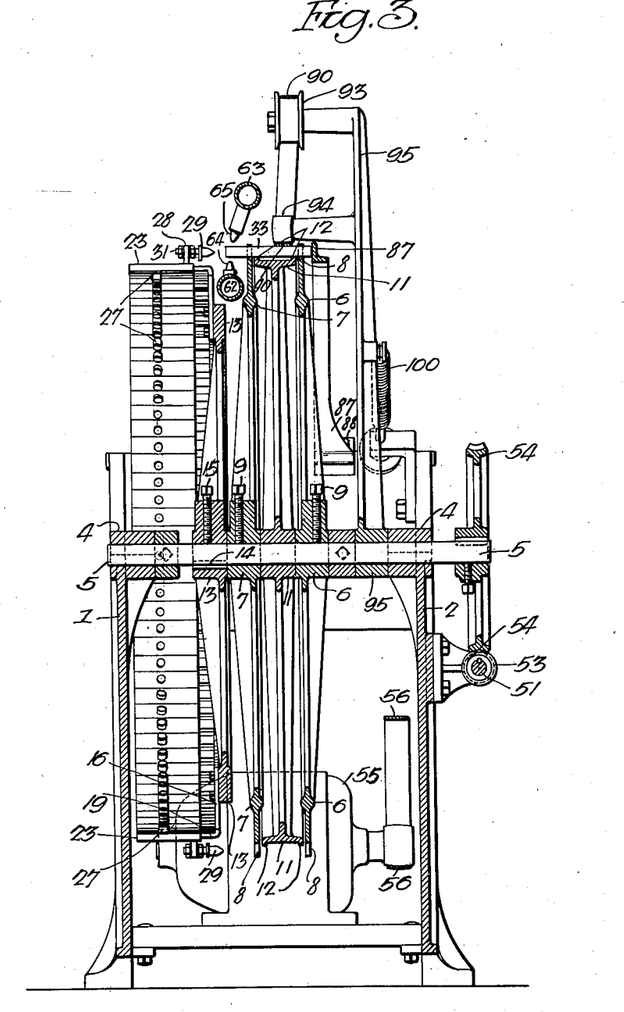
Fig. 3 is a transverse section taken on the line 3—3, Fig. 2.

With reference to the drawings, the machine comprises a main frame consisting of side frame pieces 1 and 2 secured together by suitable tie rods or cross bolts 3, 3. Journaled in bearings 4, 4, in the side frames 1 and 2 is a shaft 5 which carries thereon a pair of wheels 6 and 7 whose peripheries, as shown in Fig. 2, are formed with a plurality of evenly spaced open-mouthed circular recesses 8, 8, which recesses extend completely around the circumference of the wheels. As shown in Fig. 3, these wheels may be secured to the shaft 5 by means of set screws 9.

Figure 7:
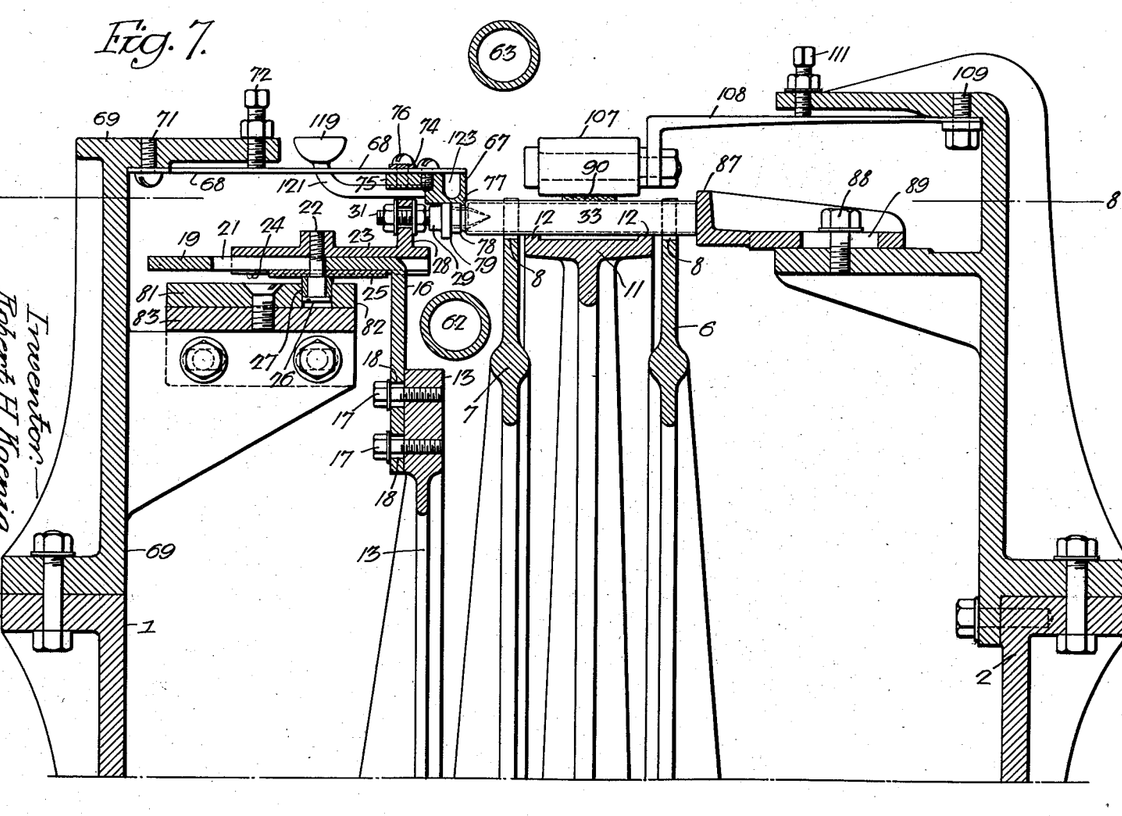
Fig. 7 is a transverse section on the line 7—7, Fig. 1.

Intermediate the wheels 6 and 7 and mounted loosely upon the shaft 5 is a wheel 11 whose peripheral surface is slightly channeled, the flanges 12, 12, forming the channel, as well shown in Fig. 7, being formed on a radius which carries them slightly beyond the bases of the recesses 8 in the wheels 6 and 7.

Figure 1:
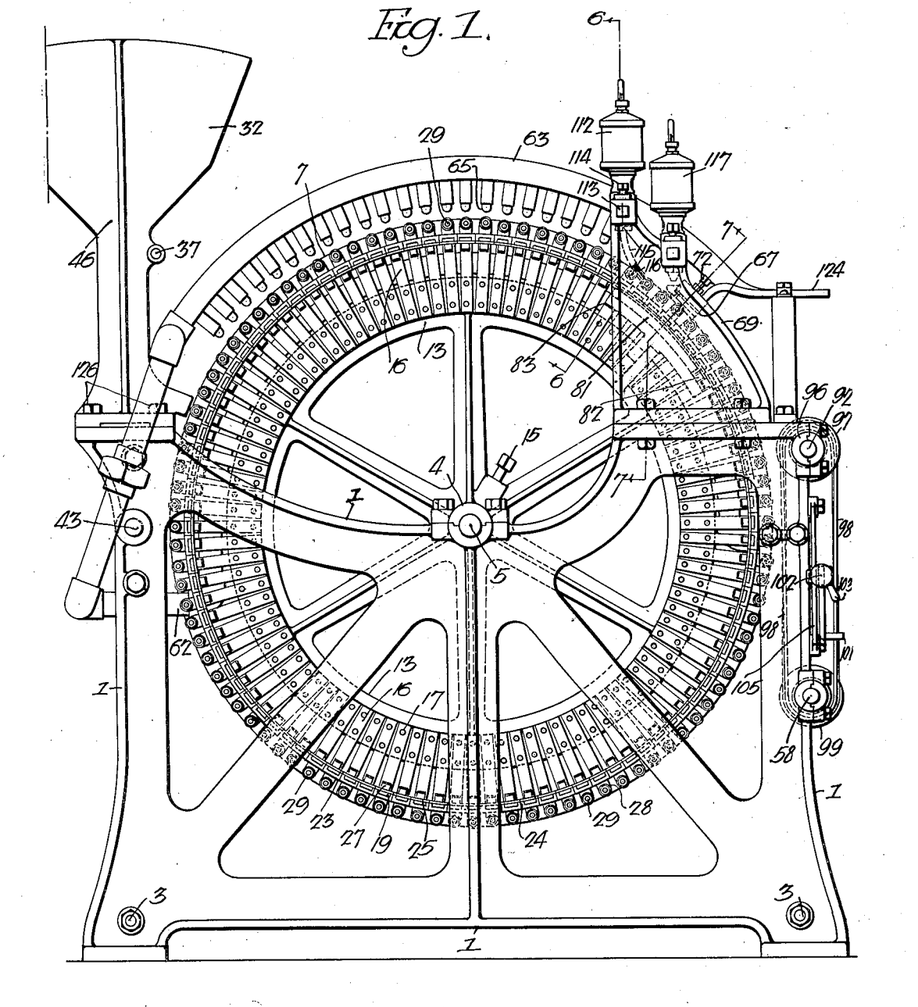
Figure 1 is a side elevation of a machine made in accordance with my invention.
Figures 6, 11:
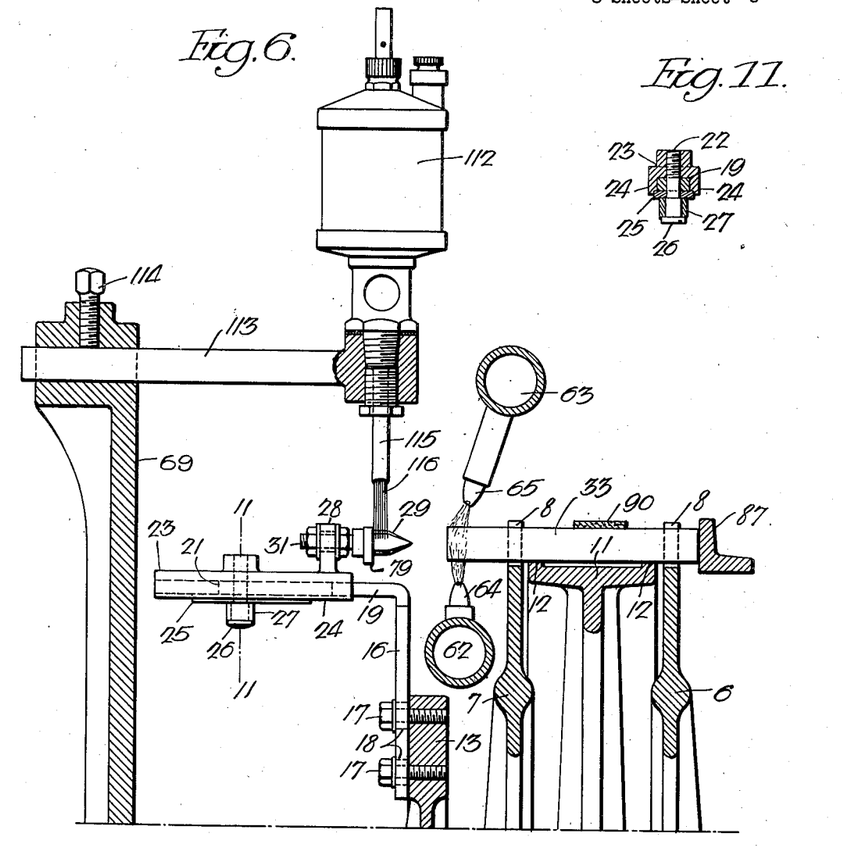
Fig. 6 is a transverse section on the line 6—6, Fig. 1.
Fig. 11 is a section on the line 11—11, Fig. 6.

A third wheel 13 is carried by the shaft 5 and is fixed to the latter in the present instance by means of a key 14, this wheel being prevented from movement axially of the shaft by means of a set screw 15. The wheel 13 carries at its periphery a plurality of angle pieces 16, evenly spaced around the circumference of the wheel, as shown in Fig. 1, and secured to the wheel in the present instance by means of bolts 17, 17. The holes 18, 18, through which the said bolts pass, are preferably larger than the bolts themselves, to provide for adjustment of these elements on the wheel. The substantially horizontal projecting leg 19 of each of the angle pieces 16 is provided with a guide slot 21 through which extends a shouldered screw 22 constituting the means for securing to each of the angle elements a rider 23 consisting as shown in Figs. 7 and 11 of a body piece having at each side depending flanges 24, 24, which pass down each side of the leg 19 of the angle piece 16, the lower edges of the depending flanges 24 being grooved for the reception of a tie plate 25 which is secured in place by means of the shoulder on the screw 22. The set screw, where it bears against the tie plate 25, is shouldered, and that portion between the shoulder and the head 26 of the screw constitutes a journal for a roller 27, the function of which will be described hereinafter.

Each of the riders 23 is provided at its inner end with an upwardly extending lug 28 apertured for the reception of mandril elements 29, the shank 31 of these elements being threaded for the reception of nuts which secure the elements in the desired positions in the lugs of the riders, as well shown in Fig. 7. The pointed ends of the elements 29, as clearly illustrated, project inwardly toward the annular recesses 8 of the wheel 7, and normally these recesses and the said mandrel elements are in alignment, there being an element for each of the recesses.

Mounted at one end of the frame is a hopper 32, which, as indicated in Fig. 2, is adapted to hold the glass tubes 33 constituting the blanks from which in the present instance vials are formed. As shown in Fig. 2, the hopper comprises a reduced lower discharge portion 34, from the lower ends of which the tubes are discharged singly onto a chute 35 which guides the tubes to the wheels 6 and 7, the tubes in a manner hereinafter described entering the more or less aligned recesses in the said wheels 6 and 7 and being carried by said wheels in their rotation through the various operations involved in forming the neck of the vial. The tubes 33 are discharged in succession from the hopper 32 by mechanism operating synchronously with the wheels 6 and 7, the discharge mechanism and the wheels being timed in their movements so that the wheels are in proper position to receive, in the said recesses 8, each of the tubes as it is discharged from the hopper.

The discharge mechanism comprises an arm 36 carried by a shaft 37 and including an offset lower end 38 adapted normally to underlie the discharge channel 34 of the hopper and thereby to prevent discharge of the tubes. The shaft 37 has attached thereto an arm 39, to the lower end of which is secured a spring 41 tending to hold the shaft in such position that the offset end 38 of the arm 36 underlies the discharge duct 34, as shown in Fig. 2.

Figure 5:
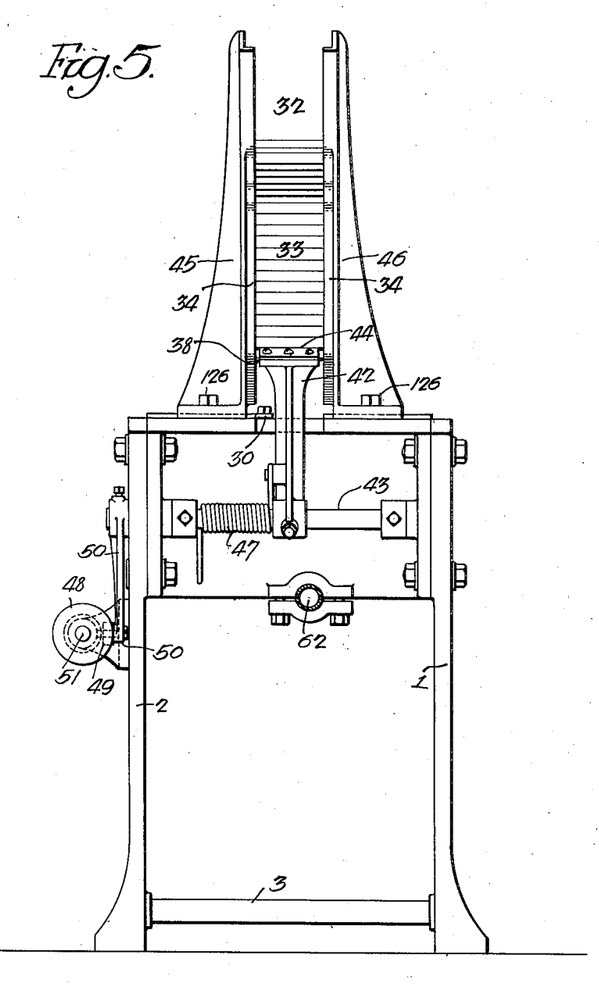
Fig. 5 is a left end elevation.

The mechanism further comprises a lever 42 carried by a shaft 43 and having at its upper end a tongue 44 adapted to pass between the sides 45 and 46 of the hopper 32,— see Fig. 5—and between the lowermost of the tubes which normally would rest upon the offset 38 of the arm 36, as shown in Fig. 2, and the next higher tube whereby when the said arm 36 is moved so as to release the lowermost of the tubes, the remaining tubes in the hopper are prevented from discharging. The tongue 44 through contact with the arm 36 and through movement of the lever in a manner to be described also effects the outward movement of the arm 36 which releases the tube lying between the tongue 44 and the offset 38 of the arm 36.

The lever 42, which, as previously described, is carried by the shaft 43, is normally advanced at the top toward the tube-releasing position by means of a coiled spring 47 on the shaft 43, and the position of the lever 42 is further controlled by a cam 48 which engages a cam roller 49 at the lower end of a lever 50 carried by the shaft 43. The cam 48 is fixed to a shaft 51 journaled in the frame, which shaft also carries a worm 53 co-active with a worm wheel 54 on the shaft 5 for operating the wheels 6 and 7.

In the present arrangement, as shown in Fig. 2, each complete rotation of the shaft 51 will cause a movement of the lever 42 first forwardly at the top, or to the right, whereby the lowermost tube is released from the hopper 32, and thereafter in a reverse direction until the end of the element 44 entirely clears the tubes in the hopper and permits them to drop down to the lower position supported by the offset 38 of the arm 36, as previously described, the lever 42 finally moving back to its initial position, as shown in Fig. 2. During this operation, the relation of the worm and worm wheel 53 and 54 is such that the wheels 6 and 7 are advanced through an angle equal to the distance between the centers of two of the recesses 8. The adjustment of the wheels 6 and 7 upon the shaft is such that one of the said recesses 8 in each wheel is always in position to receive a tube as it is discharged from the hopper and conducted to the recesses by the chute 35. The shaft 51 is operated in the present instance from an electric motor 55 mounted in the frame and connected by means of a belt 56 with a pulley wheel 57 on a shaft 58, the latter carrying a spiral gear 59 which coacts with a second spiral gear 61 on the end of the shaft 51.

Extending around the upper portions of the wheels 6 and 7 and outwardly of said wheels are a pair of pipes 62 and 63, the pipe 62 presenting a plurality of nozzles 64 projecting upwardly, and the pipe 63 presenting a series of nozzles 65 projecting downwardly, the said pipes being so disposed, as shown in Figs. 2 and 3, that the ends of said nozzles 64 and 65 are directed toward the ends of the tubes 33 which are carried by the wheels 6 and 7. The pipes 62 and 63 may be connected with any suitable source of fuel whereby flame jets may be directed from the nozzles 64 and 65 against one end of the said tubes 33, 33, occupying the recesses 8 in the wheels 6 and 7. With this arrangement, therefore, the tubes as they are deposited on the wheels 6 and 7 are carried between the rows of nozzles 64 and 65 and are thereby subjected on one end to the action of the flame. The length of time which the flame operates upon the tube is sufficient to soften the tubes to the point where they are ready for the action of the neck-forming elements, and this period of heating may obviously be controlled by the number of nozzles 64 and 65 and the rapidity of rotation of the wheels 6 and 7.

Figures 8, 9, 10:
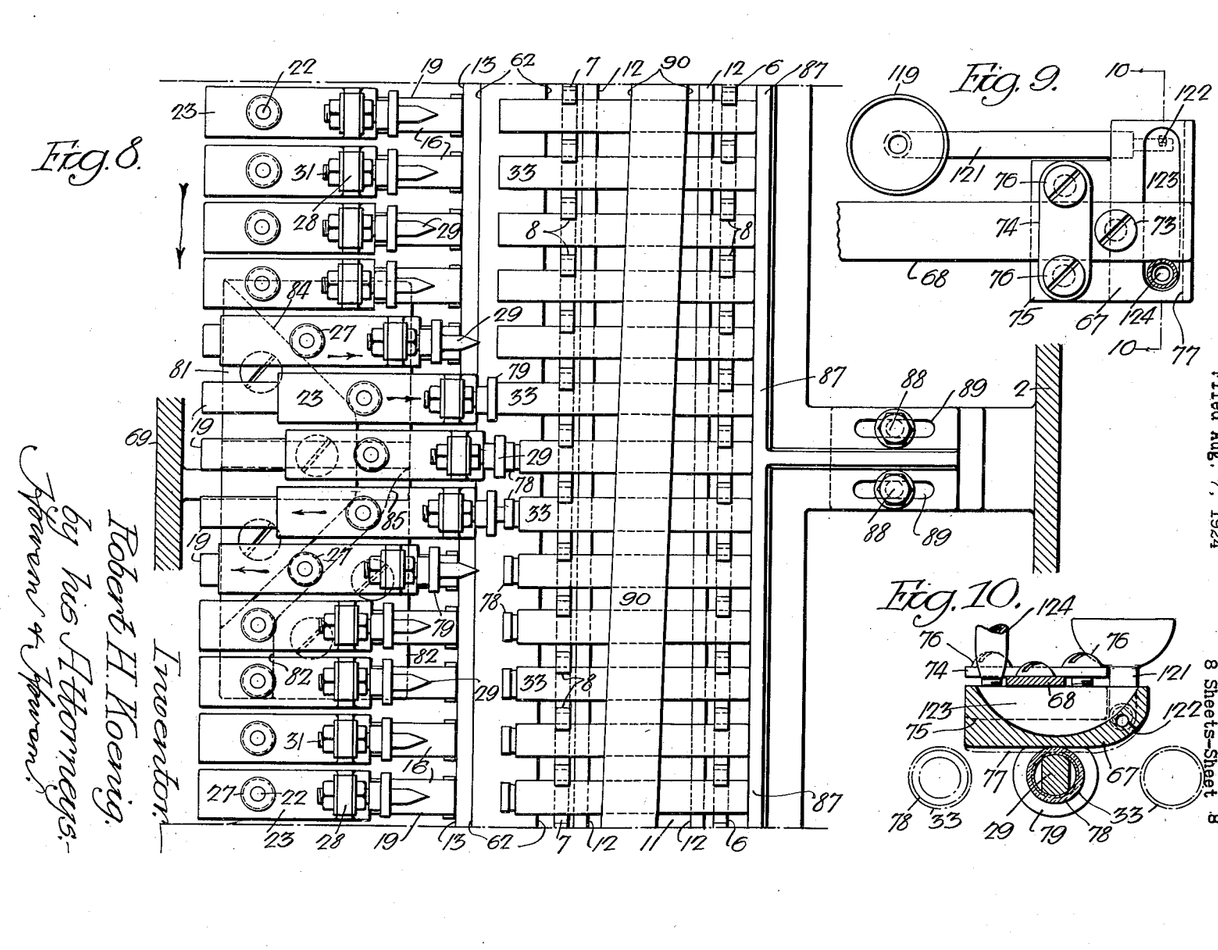
Fig. 8 is a sectional plan view on the line 8—8, Fig. 7.
Fig. 9 is a plan view of the necking tool.
Fig. 10 is a section on the line 10—10, Fig. 9.
Figure 12:
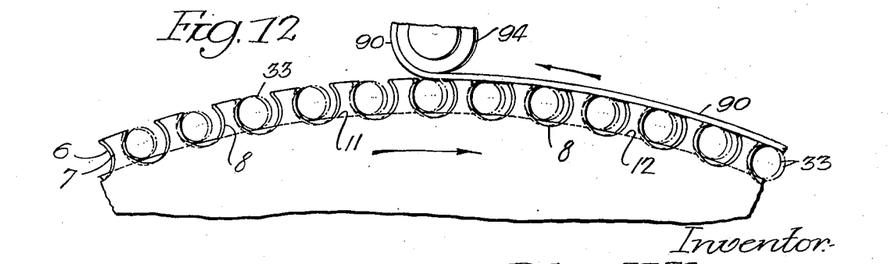
Fig. 12 is a diagrammatic view illustrating the method by means of which the tubes which constitute the blanks are held in place upon the carriage wheels.

As the tubes are advanced by the wheels 6 and 7, they are brought under a necking tool, which consists of a block 67,—see Figs. 7, 9 and 10,—which is supported at the outer end of a resilient arm 68 secured to an upward extension 69 of the frame, said arm being secured to said extension by means in the present instance of a screw 71 and being adjustable to the proper operative position by means of a set screw 72. The block 67 is secured to the arm 68 by means of a screw 73 which affords a pivotal connection between the arm and the block, and is further clamped to the arm 68 by a strap 74 under which the said arm passes and which is secured to the rear flanged portions 75 of the block by means of screws 76, 76. The connection between the block and the arm is such as to provide a limited movement of the block with respect to the arm for adjusting purposes of the block with respect to the plane of rotation of the wheels 6 and 7. The under side or working face of the block 67 is formed with a depending flange 77 which by engaging the heat softened end of the tube, as shown in Fig. 7, is adapted to form the neck proper of the vial. The block 67 in conjunction with the aforedescribed mandril elements 29 also forms the beaded top edge of the vial indicated in Fig. 7 by the reference numeral 78. In this operation, as the vial blanks 33 approach the block 67, their cooperatively aligned mandril elements 29 are advanced by means of a cam to cause said mandril elements to enter the open end of the tube, the mandril thereby supporting this end of the tube and making possible the action of the necking block 67.

As clearly illustrated in the various drawings, the mandril elements 29 in addition to the forward pointed end thereof which enters the tube are provided with a flange 79 which is flattened on one side, and as the tube with the inserted mandril passes under the block, the block is engaged by this flattened portion of the flange, which thereby prevents the necking tool from eating too deeply into the soft glass or entirely severing the end, and thereby regulates the thickness of that portion of the tube which is acted upon by the tool.

It will be understood that as the tubes are advanced by the wheels 6 and 7, that portion of the tube intermediate the wheels rests upon the flanges 12, 12, of the intermediate wheel 11, this wheel being rotated in a manner hereinafter set forth in the direction of the wheels 6 and 7 whereby the said tubes during the travel on this carriage are being continuously rotated on their own axes. The action of the necking tool will, therefore, be apparent, since as the tube blank passes under the block 67, it is supported against the under side of the block by the mandril 29, and by reason of the rotation of the tube, the flange 77 of the block presses into the soft glass and forms the annular neck, as clearly illustrated in the drawings.

The cam which controls the movement of the mandril elements 29 is illustrated in Figs. 7 and 8 and consists of plates 81 and 82 supported on a bracket 83 adjustably secured to an arm on the frame extension 69, the shapes of the plates 81 and 82 being shown in dotted lines in Fig. 8. The cam plates 81 and 82 are so arranged that they present guiding edge surfaces to the rollers 27 on the screws 22 which afford the desired reciprocation of the riders 23.

The transverse advance and retractive movements of the riders 23 are successively illustrated in Fig. 8 in which, with the longitudinal advance movement of the mandril units, which is in the direction shown by the arrow, the cam rollers engage first the surface 84 which advances the riders and brings the mandril into the open end of the tube. The rollers next engage the surface 85, which carries them into the groove between the cams 81 and 82, which thereby carries the riders back to the original retracted position. It will be noticed that the advance movement of the mandril is such that the ends of the tubes operated upon by the necking tool are slightly compressed as the neck is formed.

In order to provide a suitable backing for this compressing operation and to insure the tubes being uniformly positioned in the carriages, an arcuate abutment plate 87 is adjustably secured to the frame, as shown in Figs. 7 and 8, this plate acting as an abutment for the outer end of the tube. This abutment element 87 is adjustable on the frame toward and from the wheel 6, it being held to the frame by means of bolts 88, 88, which pass through slotted apertures 89, 89, in the abutment element.

Figure 4:
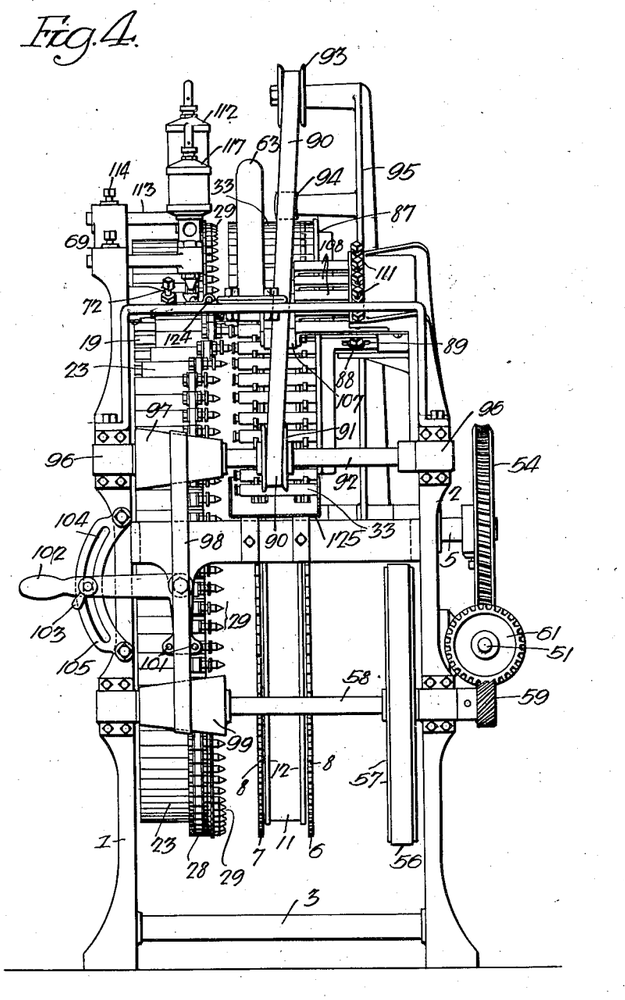
Fig. 4 is a right end elevation.

To insure that the tubes naturally assume a position on the wheels 6 and 7 such that the rear ends are normally bearing against this abutment 87, I prefer to adjust the wheels 6 and 7 relative to each other so that the recesses of the wheel 7 are slightly in advance of the corresponding recesses of the wheel 6 whereby there is a tendency of the tubes during approximately the first half of their travel on the wheels, or until they reach a vertical plane through the axis of the shaft 5, to slide down against the said abutment disk 87. After passing through the said vertical plane, however, this bias between the wheels 6 and 7 has just the opposite tendency, namely,—to work the tubes away from the stop 87. This tendency is overcome by means of a belt 90 which passes around a pulley 91 mounted on a shaft 92 an idler pulley 93 and a roller 94, which latter two are located on an arm 95 loosely mounted on the shaft 5, said idlers occupying a position above the carriage wheels 6 and 7, as shown in Figs. 2, 3 and 4. The pulley 91 is located opposite the point of discharge of the tubes from the said wheels 6 and 7, and the arrangement is such that the belt extending between the pulley 91 and the idler 94 bears down against the tubes in the said carriage. Also the belt instead of extending parallel to the travel of the said tubes is placed on a bias, as clearly shown in Figs. 4 and 8 so that from the pulley 91 to the idler 94 the belt extends and travels diagonally across the tubes towards the abutment element 87 at the top. The belt is given a movement in the direction of the arrow, Fig. 2, and the action of the belt upon the tubes with which it contacts has the effect of retaining the tubes tightly against the said abutment 87. The movement of the belt also has the effect of rotating through the tubes the intermediate wheel 11, which as previously described is loose upon the shaft 5 and is of such diameter at the flanges 12 that the latter bear against the inner sides of the said tubes. The belt, therefore, acts upon the tubes to rotate the latter in one direction and acts through the tubes upon this wheel 11 to rotate the latter in the opposite direction, and the movement of the belt is such that the rotation of the wheel 11 is the same as the wheels 6 and 7.

The belt is driven through the pulley 91, which is carried by the shaft 92 journaled in suitable bearings 96, 96, on the frame, the shaft also carrying a cone pulley 97 which through a belt 98 is connected with a cone pulley 99 upon the shaft 58 which carries the pulley wheel 57 aforementioned. A belt shifter 101 is provided for shifting the belt 98 on the cone pulleys, thereby to regulate the speed of rotation of the belt 90, the shifter being carried by one arm of a bell crank lever 102, the other arm of which carries a clamp bolt 103 which travels in a radial slot 104 in a bracket 105. An adjustable tension spring 100 is provided between the loosely mounted arm 95 and the side frame 2, for the purpose of keeping the belt 90 taut and in close contact with the tubes 33 at all times.

To make rotation of the tubes more positive as they pass under the necking block 67, I provide a series of rollers 107, 107, see Figures 2 and 7, carried on the end of resilient arms 108 attached to the frame by means in the present instance of tap bolts 109 and adjustable toward and from the belt 90 by means of set screws 111. Through the set screws, any pressure required for the positive rotation of the tubes may be exerted upon the arms 108 and through the arms upon the rollers 107.

In order to insure that the heat softened glass will not adhere to any of the operating parts, I provide a number of oil cups and ducts which maintain the operating parts in a generally lubricated condition. Thus in Figs. 1 and 6, I provide an oil cup 112 which is supported on an arm 113 detachably held in the frame by means of a set screw 114, from which oil cup a duct 115 extends to a point directly over the path of the mandril element 29. At the end of this duct, brushes 116 contact with the mandril points and apply to said points oil from the cup. Also I provide a second oil cup 117 supported on the bracket arm 69, see Fig. 1, which latter is suitably secured to the frame, and from this cup oil is passed to a cup 119, from whence through a duct 121 and suitable passages 122 oil is conducted to the working face of the necking block 67, as shown in Fig. 10. The necking block is also provided with a concaved groove 123, over which the end of the resilient arm 68 partially extends. An air nozzle 124, suitably supported on the frame, is provided to direct a flow of air into the groove 123 for the purpose of keeping the necking block 67 comparatively cool under the conditions of operation.

Feeding of the vial blanks 33 from the hopper 32 may be discontinued at will through the manipulation of a lever 30, pivoted in a horizontal plane to the frame of the machine and having a shoulder 30ª thereon which may be projected into the path of the lever 42 when in its outer position, thereby holding the roller 49 and lever 50 free of the cam 48 and preventing further discharge of the blanks from the hopper.

The operation of the machine will be apparent from the foregoing description, the operation consisting in first passing the blank tubes from the hopper 32 to the wheels 6 and 7, the tubes being discharged from the hopper in rapid succession and in synchronism with the movement of said wheels, so that the tubes enter the successive recesses 8 as the said wheels rotate. The tubes are then carried through the flame jets from the nozzles 64 and 65, and when sufficiently heated pass under the forming block 67, the mandril elements 29 being advanced into the ends of the tubes as they approach the said block. In their movement under the block, the rotation of the tubes, as described, causes the forming of the neck and head of the vial. After the tubes pass the necking block 67, the mandrils are withdrawn and the tubes after a short cooling period are discharged from the wheels 6 and 7 into a suitable receptacle through a chute 125. The tubes may then, if desired, be placed in the hopper in reverse position and again fed to the wheels whereby a neck is placed upon the opposite ends of the tubes, after which the tubes may be cut and the ends closed in well known manner.

One of the big advantages of this machine over others resides in the progressive and continuous nature of the operations. Where, for example, it may take fourteen seconds by a machine of the usual type in which one vial must be completely formed before the operations upon another are initiated, to form each vial, and although the same length of time is required for forming the individual vials in the present machine, there is in the present machine one vial formed every second.

It will be apparent, from the foregoing description, that the machine is capable of operating on blanks of a different length than that shown in the drawings, through the adjustment of the side walls of the hopper 32, by loosening the tap bolts 126 which secure the same to the frame; and by adjusting the abutment 87 on the frame of the machine.

It is obvious that the machine may be in detail considerably modified without departure from the essential features of the invention, and it will be understood that the machine in principle and properly modified may be used in the manufacture of other articles than vials and for making other shapes than herein described.

I claim:

1. In a machine for shaping ends of glass tubes, the combination with a conveyer, said conveyer being rigid and having a plurality of tube-carrying means, of a second rigid conveyer substantially paralleling the first and mounted to move in fixed relation thereto, said second conveyer having a plurality of mandrel elements arranged in alignment with the tube-carrying means of the conveyer first named, and means for advancing said mandrel elements into engagement with tubes carried by the first-named conveyer at a predetermined point in the travel thereof.

2. In a machine for shaping ends of glass tubes, the combination with a rotary shaft, of a pair of wheels secured to said shaft in spaced relation and each of said wheels having a plurality of recesses in which the tubes are adapted to lie, a wheel loosely mounted on the shaft intermediate the said peripherally recessed wheels and adapted to engage the tubes positioned in said recesses, and means operative through at least one of the tubes carried by the first-named wheels for rotating said inner wheel and for thereby revolving the other tubes about their respective axes.

3. In a machine for shaping ends of glass tubes, the combination with movable tube-carrying means, of heating and shaping elements adapted to operate on said tubes while traveling with the carrying means, and means for rotating the tubes about their own axes on the said carrying means including elements differentially movable with respect to the carrying means and respectively engaging opposite sides of said tubes.

4. In a machine for shaping ends of glass tubes, the combination with a traveling conveyer having means for holding a plurality of tubes, of relatively movable means engaging at least one but not all of said tubes for rotating the latter about their own axes on the conveyer, and freely movable means engaging all of said tubes and adapted to rotate those of the tubes not engaged by the first-named tube-rotating means.

5. In a machine for shaping the ends of glass tubes, the combination with a rotary shaft, of a circular tube-carrying member having means distributed around the periphery for holding said tubes, a member freely rotatable on the shaft and adapted to engage all the tubes carried by said circular member, and power driven means engaging at least one of said tubes for rotating said tube about its own axis on the circular carrying member.

6. In a machine for shaping ends of glass tubes, the combination with a rotary shaft, of a circular tube-carrying member having a plurality of tube-carrying means distributed around its periphery, a circular member loosely mounted on the shaft and adapted to engage all of the tubes carried by the circular tube-carrying means, and a power belt adapted to engage at least one of the tubes on the carrying means to rotate the latter about its own axis.

7. In a machine for shaping ends of glass tubes, the combination with a rotary shaft, of a circular tube-carrying member mounted on the shaft and having peripheral tube-holding means, a second circular member carried by the shaft, a plurality of mandrel elements on said second member corresponding in number and position with the peripheral tube-carrying means, a single forming tool adapted to operate upon tubes as they are advanced by the tube-carrying means, and cam means adjacent the forming means adapted to axially move the respective mandrel elements into engagement with the tubes on the carrier during the forming operation.

8. In a machine for shaping ends of glass tubes, the combination with a pocketed conveyer, of independently movable supporting means for tubes occupying said pockets, and means operative through the supported tubes for moving said supporting means with respect to the conveyer.

9. In a machine for shaping ends of glass tubes, the combination with a rotary shaft, of a pair of wheels mounted upon the shaft and having in their peripheries a plurality of recesses, the corresponding recesses of the two wheels constituting a cradle for support of a blank vial, and a relatively fixed abutment for one end of the blanks supported in the cradles, the corresponding recesses in the two wheels being axially misaligned to insure the blanks bearing against said abutment.

ROBERT H. KOENIG.